March 23, 1948.    R. DENMARK    2,438,113
METHOD AND APPARATUS FOR WINDING GRIDS
Filed Nov. 5, 1943    2 Sheets-Sheet 1
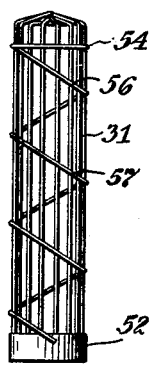
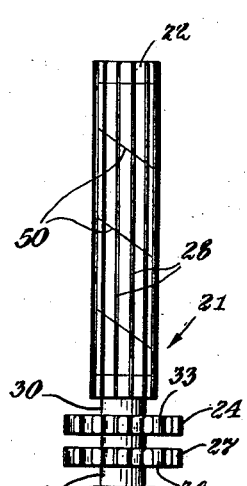
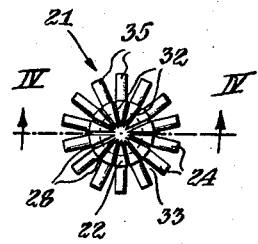
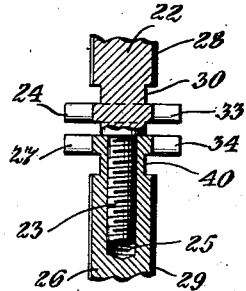
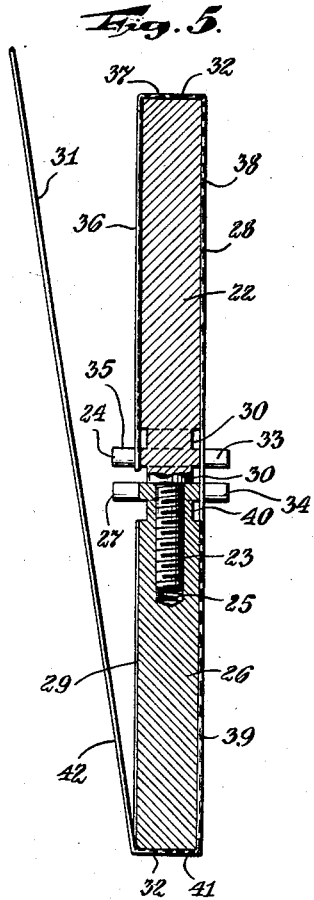
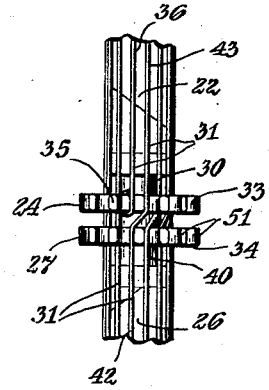
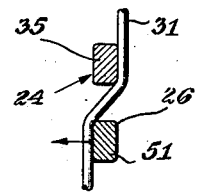
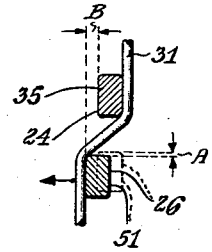
INVENTOR
ROBERT DENMARK.
BY
ATTORNEY March 23, 1948.  R. DENMARK  2,438,113
METHOD AND APPARATUS FOR WINDING GRIDS
Filed Nov. 5, 1943  2 Sheets-Sheet 2
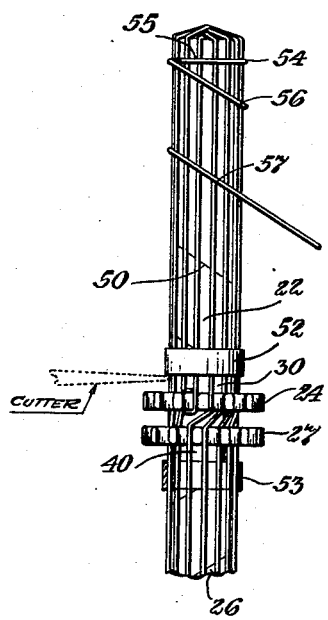
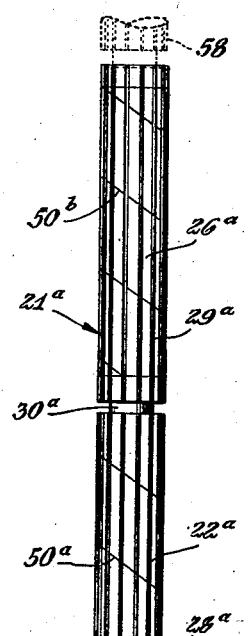
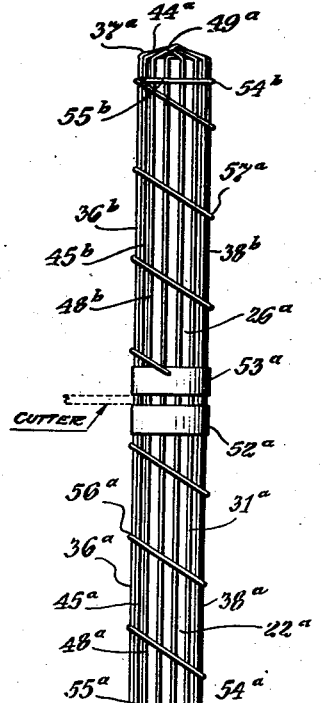
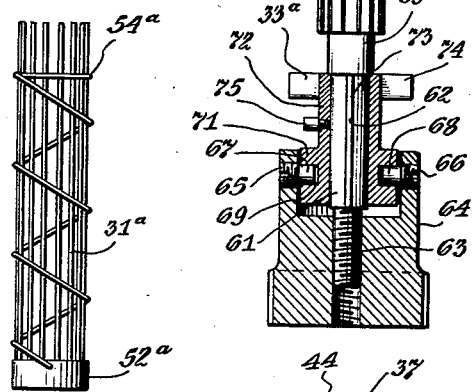
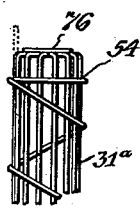
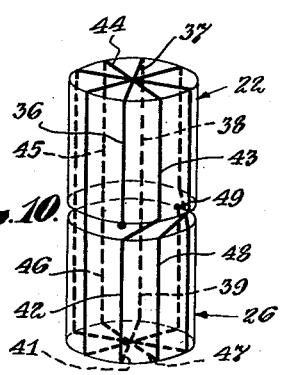
INVENTOR
ROBERT DENMARK.
BY
ATTORNEY Patented Mar. 23, 1948

2,438,113

UNITED STATES PATENT OFFICE 2,438,113

METHOD AND APPARATUS FOR WINDING GRIDS

Robert Denmark, New York, N. Y., assignor to Westinghouse Electric Corporation, East Pittsburgh, Pa., a corporation of Pennsylvania Application November 5, 1943, Serial No. 509,145

17 Claims. (Cl. 140—71.5)

1

This invention relates to grids and, more particularly, to an improved method of manufacturing the same and apparatus for the purpose.

The principal object of my invention, generally considered, is to form a plurality of grids in one operation, rather than one at a time.

Another object of my invention is to provide a mandrel for winding a plurality of grids as one operation, and stretching the elements of said grids prior to separation thereof from one another.

A further object of my invention is to wind a plurality of grids on a mandrel consisting of portions movable with respect to one another, and then simultaneously stretching all of the elements of said grids by relative movement of said mandrel parts.

Other objects and advantages of the invention, relating to the particular arrangement and construction of the various parts, will become apparent as the description proceeds.

Referring to the drawings illustrating embodiments of my invention, in which the parts are shown substantially to scale and enlarged, except for the diagram of Fig. 10:

Fig. 1 is an elevational view of a grid which may be formed in accordance with my invention.

Fig. 2 is an elevational view of one form of mandrel which may be employed for simultaneously winding a plurality of grids of the type shown in Fig. 1.

Fig. 3 is an end elevational view of the mandrel illustrated in Fig. 2.

Fig. 4 is a fragmentary, axial sectional view on the line IV—IV of Fig. 3, in the direction of the arrows.

Fig. 5 is an axial sectional view of the mandrel, also on the line IV—IV of Fig. 3, and showing the position of the wire used for winding grids thereon shortly after the beginning of the grid forming operation.

Fig. 6 is a fragmentary elevational view of the mandrel with wire thereon forming the foundation of a pair of grids, shown in the course of production prior to final stretching of the parallel elements thereof.

Fig. 7 shows a further enlarged fragmentary portion of such a mandrel, for the purpose of illustrating the manner of stretching the elements of the formed grids.

Fig. 8 is a view corresponding to Fig. 7, but after relative movement between the mandrel elements, showing the effect such movement has in elongating the grid elements for final forming thereof.

2

Fig. 9 is a view corresponding to Fig. 6 but showing a mandrel with a pair of grids completely formed and stretched thereon, insofar as the parallel elements forming the basic cylindrical portions are concerned, the rigidifying helical wire being shown in the course of application thereto.

Fig. 10 is a perspective diagram, corresponding generally with Fig. 6, for the purpose of explaining how the grid-winding operation is effected.

Fig. 11 is a view corresponding to Fig. 2, but showing a modification.

Fig. 12 is an elevational view of the modified mandrel of Fig. 11 after a pair of grids have been wound and stretched thereon.

Fig. 13 is a view corresponding to Fig. 1 but showing a modified grid as formed on the mandrel of Fig. 11.

Fig. 14 is a view corresponding to Fig. 13 but showing how the end portion of the grid of Fig. 13 is finished.

Fig. 15 is an end view of the grid of Fig. 14 after it is finished.

It has been the practice to form cylindrical cage-like grids of the type illustrated, for example, in the Ronci Patent No. 2,277,148 of March 24, 1942, as well as those of smaller size, as for radio tubes manufactured by the Westinghouse Electric & Manufacturing Company, one at a time as on a mandrel comprising a handle and a grid holding portion. In accordance with this, after a single grid has been wound, portions of the forming wires therebeyond are cut off and discarded. Inasmuch as such grids are generally formed of platinum, discarding a relatively large proportion of the material used in manufacture represents a considerable loss.

In accordance with my invention, I propose to make two or more grids simultaneously on a single mandrel and with considerably less waste of wire per grid than heretofore.

Referring to the drawing in detail, like parts being designated by like reference characters, and first considering the embodiment of my invention illustrated in Figs. 1 to 9, inclusive, there is shown a mandrel 21 which in the present embodiment is formed in two parts, that is, a grid holding part 22 having a threaded extension 23 of reduced section beyond a slotted disk, wheel or "butterfly" 24, united to said holding part 22 by a portion 30 of reduced section, said threaded extension engaging a correspondingly threaded pocket 25 in the other grid holding part 26, which also has a slotted disk, wheel, or "butterfly" 27, united thereto by a portion 40 of reduced section. Each of the grid holding parts, 22 and 26, is formed with a series of equally spaced longitudinal surface grooves thereon, those on the portion 22 being designated 28 and those on the portion 26 being designated 29. The grooves 28 correspond in number with the grooves 29, and both correspond in size with the wire 31 used to make the grids, that is, they are generally semi-circular in section so as to guide and snugly receive about half of each part of the cylindrical wire being wound. In the present embodiment I have shown fourteen grooves 28 and a like number of grooves 29, although I do not wish to be limited to this.

The ends of the grid-holding mandrel portions 22 and 26 are milled like the cylindrical surfaces to provide corresponding radial grooves 32 uniting diagonally opposite longitudinal grooves for guiding the grid-forming wires in the desired manner. The disks 24 and 27 are provided with notches 33 and 34, respectively aligned with the grooves 28 and 29.

In winding a pair of grids, as in the embodiment of these figures, I desirably proceed in accordance with the diagram of Fig. 10, that is, I secure one end of the wire 31 of platinum, or other desired material, around one of the outstanding posts 35 defining the notches 33, and then, all the time stretching the wire by hand as much as conveniently possible, run it up along the corresponding groove 28, forming the cylindrical element 36, then along the corresponding radial groove 32, forming the radial element 37; then back down along the opposite cylindrical groove 28, forming the cylindrical element 38; on through the corresponding slots 33 and 34, forming the cylindrical element 39 of the other grid; on along the corresponding radial groove 32 of the mandrel portion 26, forming the radial grid member 41; up along the corresponding groove 29 of the grid member 26, forming the corresponding longitudinal grid member 42, through the corresponding slot 34 of the disk 27; diagonally from the slot 34, to the next slot 33 to the right in the disk 24; on along corresponding groove 28 of the mandrel portion 22, forming the longitudinal grid element 43; radially along the corresponding groove 32, forming the grid element 44; longitudinally in the corresponding grooves 28 and 29 through corresponding notches 33 and 34, parallel to the elements 38 and 39, forming the longitudinal grid elements 45 and 46; radially along the corresponding groove 32 in the end of the mandrel portion 26, forming the grid element 47; longitudinally along the corresponding groove 29, forming the grid element 48; through the corresponding slot 34 in the disk 27; diagonally across to the next slot 33 to the right in the disk 24; and continuing until all the longitudinal and radial slots are filled, as illustrated in Figs. 9 and 10.

The end 49 of the forming wire is finally secured around the corresponding post 51 of the disk 27, at approximately the opposite side from the starting point, as will be clear from Fig. 10. Although this figure shows only eight grooves around the periphery of the mandrel portion, instead of fourteen, the principle is exactly the same. Fig. 10 is shown with a fewer number of grooves in order to make it clearer by avoiding some lines.

After this winding has been completed, as illustrated in Fig. 9, the wire forming the grids is further stretched to draw the longitudinal elements thereof into strictly parallel relationship, as by turning the mandrel part 26 to the left with respect to the mandrel part 22, or counter-clockwise as viewed from the bottom end, as illustrated in Fig. 8 as compared with Fig. 7, thereby increasing the distance between the disks 24 and 27, in accordance with the pitch of the threads (assumed to be right hand) on the element 23, while at the same time causing circumferential movement therebetween, thereby pulling on the wire elements, on account of the increased distance between the points of engagement of said elements with the posts 35 and 51, and stretching the longitudinal elements of the formed grids straight and into parallel relationship with one another in the corresponding grooves 28 and 29.

After said grids have been formed, insofar as their longitudinal and radial elements are concerned, they are completed by applying bands 52 and 53 over their adjacent end portions and welding the same thereto, as indicated in Fig. 9. A rigidifying wire, one of which is indicated at 54, is wound around each grid, first circumferentially around the closed or outer end portion, as indicated at 55, and then helically, along the corresponding mark 50 on the mandrel, as indicated at 56 and 57 until it meets the corresponding band, 52 or 53, and is united thereto, as by spot welding. Each point of engagement between the circular portion 55 and the helical portions 56 and 57 with the corresponding longitudinal portions of the grid is united as by spot welding, thereby producing a relatively strong rigid construction, and effectively holding the longitudinal elements of the grids equally spaced and parallel with respect to one another.

After this welding operation has been completed the grids are separated from each other, as by cutting the sections of wire projecting beyond the bands 52 and 53 and removing the grids from the mandrel portions, thereby completing the operation.

Referring now to the embodiment of my invention illustrated in Figs. 11 to 15, inclusive, there is shown a mandrel 21ᵃ which, like that of the preceding embodiment, is formed in a plurality of parts 22ᵃ and 26ᵃ, which parts are united by a portion 30ᵃ of reduced section. Although only two of these grid-winding parts are illustrated in full lines, yet, if desired, one or more additional and similar parts 58, such as fragmentarily shown in dotted lines, may be employed. One of said parts, in this instance the lower part 22ᵃ, has a reduced extension 59 thereon from which projects another reduced extension 61, formed with a keyway 62 and terminating in a threaded extension 63 of still smaller diameter.

Threadably mounted on the extension 63 is a knurled drum 64 carrying set screws 65 and 66 with heads threadably engaging the same, and having unthreaded shanks 67 and 68, riding in a peripheral groove 69 in the drum portion 71 of a cylindrical member 72 mounted on, and longitudinally movable with respect to, the extension 61, but prevented from rotation with respect thereto by a key 73 fitting the keyway 62, and a corresponding keyway in the member 72.

The member 72 carries a disk, wheel or "butterfly" 74, corresponding generally with the member 33 of the preceding embodiment and used for a similar purpose. It also carries a stud 75 which may be threadably applied thereto as indicated, in order to provide something to which to tie the end of the wire from which the grid is to be wound, although this not essential as one of the posts 35ª defining the notches 33ª in the member 74 may be instead used for the purpose, if desired. The arrangement involving the threaded connection of the knurled drum 64 is for the purpose of stretching the wire of the grids after forming, as will be explained.

Each of the grid-holding parts 22ª, 26ª, and if used 58, is formed, as in the preceding embodiment, with a series of equally-spaced longitudinally extending surface grooves, those on the portion 22ª being designated 28ª, and those on the portion 26ª being designated 29ª. The grooves 28ª correspond with the grooves 29ª in number and both correspond in size with the wire 31ª used to make the grids, that is, they are generally semi-circular in section so as to guide and snugly receive about half of each part of the cylindrical wire being wound. In the present embodiment I have shown fourteen grooves 28ª and a like number of grooves 29ª but, of course, I do not wish to be limited to this number as any reasonable even number may be used.

The extreme or free end of the uppermost or last grid-forming mandrel portion, in the present instance 26ª, is milled like the cylindrical surface to provide corresponding radial grooves, like those designated 32 in the preceding embodiment, for uniting diagonally opposite longitudinal grooves, in order to guide the grid forming wires in the desired manner. The disk 24ª has its notches 33ª respectively aligned with the aligned grooves 28ª and 29ª. If one or more additional portions 58 are used, it, or they, have their surfaces correspondingly grooved and the end one has radial grooves as previously described.

In winding a pair of grids on the mandrel device illustrated in these figures, I desirably proceed as follows: I secure one end of the wire 31ª of platinum, or other desired material, about the post 75, or one of the posts 35ª defining the notches 33ª and then, all the time stretching the wire by hand as much as is conveniently possible, run it up along the corresponding groove 28ª; then along the corresponding groove 29ª, forming the cylindrical grid elements 36ª and 36ᵇ; then along the corresponding radial groove, forming the radial element 37ª; then back down along the opposite cylindrical grooves 29ª and 28ª, forming the cylindrical elements 38ᵇ and 38ª; through the corresponding slot 33ª; around the corresponding post 35ª in a right hand or clockwise direction, as viewed from the bottom in Fig. 12; and then on back along the corresponding grooves 28ª and 29ª, forming longitudinal elements not visible in Fig. 12; on along the corresponding radial groove of the portion 26ª, forming the radial grid member 44ª; down along the corresponding grooves 29ª and 28ª of the grid member 22ª and 26ª, forming corresponding longitudinal grid members 45ᵇ and 45ª; through the corresponding slot 33ª in the disk 24ª; around the corresponding post 35ª to the right, or clockwise as viewed from the bottom; and back up along the corresponding grooves 28ª and 29ª of the mandrel members 22ª and 26ª, forming the corresponding longitudinal grid elements 48ª and 48ᵇ; along the corresponding radial groove in member 26ª, forming the radial grid member 49ª; and so on until both, or all, of the mandrel members have all of their grooves filled with wire, thereby forming two or more grids, except for the stretching and the application of additional strengthening members.

The end of the forming wire is finally secured around the corresponding post 35ª, or the special stud 75, at approximately the starting point, as will be clear from the foregoing with reference to Figs. 11 and 12.

After this winding has been completed, as illustrated in Fig. 12, the wire forming the grids is further stretched to draw the longitudinal elements thereof into strictly parallel relationship, as by turning the knurled drum 64 to the left, or counterclockwise as viewed from below with respect to the mandrel parts, thereby increasing the distance between the disk 24ª and the grooved mandrel portions in accordance with the pitch of the threads (assumed to be right handed) on the extension 63, and pulling on the wire elements as represented by the position of the disk 24ª in Fig. 11 and that of Fig. 12, or between the dotted and full line positions of said disk in said latter figure, thereby stretching the longitudinal elements of the formed grids strongly and into parallel relationship with one another in the corresponding grooves 28ª and 29ª.

After said grids have been formed, insofar as their longitudinal elements and the radial elements of the uppermost or end grid are concerned, they have bands 52ª and 53ª applied thereover, as shown in Fig. 12, that is, over the adjacent end portions of the plurality of grids to be formed, said bands being then welded thereto.

A rigidifying wire for each grid is then wound, as indicated at 54ª and 54ᵇ, first circumferentially around the outer or remote ends of said grids, as indicated at 55ª and 55ᵇ, and then helically along the corresponding marks 50ª and 50ᵇ, as indicated at 56ª and 57ª, until it meets the corresponding band 52ª or 53ª and is united thereto as by spot welding. Each point of engagement of the circular portions 55ª and 55ᵇ and the helical portions 56ª and 57ª with the corresponding longitudinal portions of the grids is united as by spot welding, thereby producing a relatively strong, rigid construction and effectively holding the longitudinal elements of the grids equally spaced and parallel with respect to one another.

After this welding operation has been completed, the grids are separated from each other, as by cutting the sections of wire between the bands 52ª and 53ª and those below or toward the disk 33ª beyond the grooved mandrel portion 22ª, and removing the grids from the mandrel portions, thereby completing the operation.

This removal leaves the outer or topmost grid complete, but the other or others are left in a condition as viewed in Fig. 13, that is, with their upper or unbanded ends open. This end, or these ends, is, or are, desirably closed in the manner represented in Fig. 14, that is, by bending the end portions of the projecting wires radially toward one another, and either securing them together as by spot welding, or uniting all to a disk 76 of platinum or other suitable metal.

In accordance with the embodiment of Figures 11 to 15 inclusive, the stretching is uniform because all of the longitudinal wires extend parallel to one another and the elongation is in a direction parallel to said wires. However, in the embodiment of Figures 1 to 10, inclusive, there are diagonal connections between the grids, as for example where the longitudinal element 42 is joined to the longitudinal element 43. Inasmuch as some of the connections are longitudinal, as for example where the longitudinal element 38 is united to the longitudinal element 39, as viewed in Fig. 10, it is impossible to effect uniform stretching of all the elements by a simple longitudinal separation, as such would stretch the longitudinal connections more than the diagonal connections. Nor is it possible to effect uniform stretching by a simple rotational movement, which would stretch the diagonal elements more than the longitudinal element.

However, by correlating the pitch of the threads on the extension 23 with the number of longitudinal elements of the grids to be formed, a ratio between the longitudinal stretching, designated by the reference character A, and the circumferential stretching, designated by the reference character B, both in Fig. 8, may be set so that all of the grid wires are stretched uniformly and to the desired extent upon a given twisting movement, assuming of course that the initial hand winding is uniform in its stretching action.

From the foregoing disclosure it will be seen that I have devised a method and apparatus for winding a plurality of grids at one time which involves the following advantages:

1. The mandrel, which is desirably made of copper, brass, or other suitable material, may be made more cheaply per grid.

2. At least twice as many grids may be produced in a given time than in accordance with the old method.

3. A considerable saving of wire may be effected.

4. Production of grids is correspondingly speeded up.

5. Mandrels may be produced in quantity by slotting a long copper rod of proper diameter and sawing into lengths as desired.

Although preferred embodiments of my invention have been disclosed, it will be understood that modifications may be made within the spirit and scope of the appended claims.

I claim:

1. The method of manufacturing grids for electronic devices comprising forming a loop of one, then a loop of another, then another loop of the first, then another loop of said other, and so on until all of said loops are made, securing bands to the individual wires of said grids at the adjacent portions thereof in order to maintain the desired relationship between said wires, winding a wire helically around said assembled loops and securing thereto, and securing the corresponding end of said helical wire to said band.

2. The method of forming a plurality of grids in one operation, comprising alternately making the separate elements thereof, pulling longitudinally on the end portions of the elements of said grids, while the opposite end portions are secured, in order to stretch and straighten the individual grid elements, and securing bands to the individual wires of said grids at the adjacent portions thereof, in order to maintain the desired relationship between said wires.

3. The method of winding grids for electronic devices comprising taking a generally cylindrical mandrel divided into a plurality of elements by portions of reduced section, said elements being connected so as to turn axially with respect to each other, each of said elements having a plurality of longitudinally extending grooves, uniformly spaced circumferentially, and at least one set of said grooves being united at an end by radial grooves, winding a wire in said grooves and about said mandrel to form, first, a loop of one grid, then a loop of another grid, then another loop of the first, then another loop of said other, and so on until all of the grid loops are formed, and then turning said mandrel elements with respect to one another so as to stretch and straighten the loop elements in said grooves.

4. The method of winding grids comprising taking a generally cylindrical mandrel divided into a plurality of elements by portions of reduced section, the outer surfaces of said elements having longitudinally extending grooves uniformly spaced and of such size as to receive and guide a grid-forming wire, winding such wire about said mandrel by placing the separate elements for a plurality of grids alternately in said grooves, until all of the elements of a plurality of grids are assembled on said mandrel, and then pulling axially on the ends of all of said elements to stretch and straighten them in said grooves.

5. A mandrel for forming a plurality of grids in one operation, comprising a generally cylindrical device divided into a plurality of elements by portions of reduced section, each of said elements having a plurality of longitudinally extending grooves uniformly spaced circumferentially, and at least one set of said grooves being united at an end by radial grooves, all of said grooves serving to guide and hold the grid-forming wire.

6. A mandrel for forming a plurality of grids in one operation, comprising a generally cylindrical device divided into a plurality of elements by portions of reduced section, said elements being connected so as to turn axially with respect to each other other, each of said elements having a plurality of longitudinally extending grooves uniformly spaced circumferentially, and at least one set of said grooves being united at an end by radial grooves, all of said grooves serving to guide and hold the grid-forming wire.

7. A mandrel for forming a plurality of grids comprising a generally cylindrical member divided into a plurality of elements by portions of reduced section, the outer surfaces of said elements having longitudinally extending grooves uniformly spaced and of such size as to guide and receive the grid forming wire, the grooves in one element being alined with the corresponding grooves in another element, and means at one end of said mandrel for stretching the wire in said grooves.

8. A mandrel for forming a plurality of grids comprising a generally cylindrical member divided into a plurality of elements by portions of reduced section, the outer surfaces of said elements having longitudinally extending grooves uniformly spaced and of such size as to guide and receive the grid forming wire, the grooves in one element being alined with the corresponding grooves in another element, means comprising a disk notched to correspond with said grooves and mounted on an extension at one end of said mandrel, and threadably connected means to pull said disk axially with respect to said mandrel for stretching the wire in said grooves.

9. The method of forming a plurality of cylindrical cage-like grids, comprising alternately winding in one operation the seperate longitudinal elements of the grids along a cylindrical surface having an axis common to said grids, so that said elements are substantially parallel to said axis, applying means to hold the longitudinal elements in position, and severing said elements along a plane transverse to said axis to divide the wound structure into grids of desired length.

10. The method of forming cylindrical cage-like grids for electronic devices, comprising winding in one operation along a cylindrical surface having an axis common to said grids, a straight element of one, then a straight element of another, and continuing until a plurality of such grids axially alined are formed, applying means to hold said straight elements in position, and severing said elements along a plane transverse to said axis to divide the wound structure into grids of desired length.

11. The method of forming cylindrical cage-like grids for electronic devices, comprising winding an axially extending loop of one, then an axially extending loop of another, then another axially extending loop of the first, then another axially extending loop of the other, longitudinal elements of said loops extending along a cylindrical surface having an axis common to said grids, and continuing until a plurality of such grids axially alined are formed, applying means to hold the longitudinal elements in position, and severing said elements along a plane transverse to said axis to divide the wound structure into grids of desired length.

12. The method of forming a plurality of cylindrical cage-like grids for electronic devices, comprising alternately winding a loop of one, then a loop of another, then another loop of the first, then another loop of said other, and so on until a relatively-long wound structure is formed, with the longitudinal elements of said loops extending substantially parallel to one another along a cylindrical surface having a single axis, stretching said individual loops, applying means to hold said longitudinal elements in position, and severing said elements along a plane transverse to said axis.

13. The method of forming a plurality of cylindrical cage-like grids, comprising winding a loop of one, then a loop of another, then another loop of the first, then another loop of said other, and so on until all of said grid loops are formed with the longitudinal elements thereof lying along a cylindrical surface having a common axis, so that said elements are substantially parallel thereto, effecting a twisting movement of portions of said grid loops with respect to others to stretch and straighten loop elements thereof, applying means to hold the longitudinal elements in position, and severing said elements along a plane transverse to said axis to remove the twisted portions and divide the wound structure into grids of desired length.

14. The method of forming a plurality of cylindrical cage-like grids for electronic devices, comprising forming a loop of one, then a loop of another, then another loop of the first, then another loop of said other, and so on until all of said loops are made, with longitudinal elements thereof extending substantially parallel to one another along a cylindrical surface, securing bands to the individual elements of the contemplated grids at the adjacent portions thereof, in order to maintain the desired relationship therebetween, and severing said elements along a plane transverse to said axis.

15. The method of forming a plurality of cylindrical cage-like grids, comprising forming a loop of one, then a loop of another, then another loop of the first, then another loop of said other, and so on until all of said loops are made, with the separate longitudinal elements extending along a cylindrical surface and substantially parallel to the axis of said surface, securing bands to the individual elements of said loops at the portions adjacent proposed ends of individual grids, in order to maintain the desired relationship between said elements, and severing said elements along a plane transverse to said axis to separate the proposed grids.

16. The method of forming a plurality of cylindrical cage-like grids, comprising alternately winding the separate longitudinal elements of the proposed grids along a cylindrical surface so that said elements are substantially parallel to the axis of said surface, pulling longitudinally on end portions of the elements, while the opposite end portions are secured, in order to stretch and straighten the individual elements, applying means to hold the longitudinal elements in position, and severing said elements along a plane transverse to said axis.

17. The method of forming a plurality of cylindrical cage-like grids, comprising alternately winding the separate longitudinal elements of the grids, so that such elements of one proposed grid are alined with those of another and disposed along a cylindrical surface having an axis common to said grids and substantially parallel to said axis, pulling longitudinally on the end portions of all of said elements to stretch and straighten the same, applying means to hold the longitudinal elements in position, and severing said elements along a plane transverse to said axis to divide the wound structure into grids of desired length.

ROBERT DENMARK.

REFERENCES CITED

The following references are of record in the file of this patent:

UNITED STATES PATENTS

| Number | Name | Date |
| --- | --- | --- |
| 1,897,460 | Anderson et al. | Feb. 14, 1933 |
| 2,272,869 | Herzog | Feb. 10, 1942 |
| 2,009,205 | Randall et al. | July 23, 1935 |
| 937,861 | Prinz | Oct. 26, 1909 |
| 1,669,145 | Prindle | May 8, 1928 |
| 2,255,906 | Umbreit | Sept. 16, 1941 |
| 2,165,135 | Garner | July 4, 1939 |
| 2,064,169 | Kershaw | Dec. 15, 1936 |
| 1,991,606 | Eitel et al. | Feb. 19, 1935 |
| 2,185,106 | Krahl | Dec. 26, 1939 |
| 2,188,906 | Lackey | Feb. 6, 1940 |